United States Patent
DeBraal et al.

(10) Patent No.: US 6,811,843 B2
(45) Date of Patent: Nov. 2, 2004

(54) INSULATED BEVERAGE OR FOOD CONTAINER

(75) Inventors: John Charles DeBraal, Appleton, WI (US); John MacKay Lazar, Custer, WI (US)

(73) Assignee: Appleton Papers Inc., Appleton, WI (US)

( * ) Notice: Subject to any disclaimer, the term of this patent is extended or adjusted under 35 U.S.C. 154(b) by 0 days.

(21) Appl. No.: 09/923,332

(22) Filed: Aug. 8, 2001

(65) Prior Publication Data

US 2003/0003251 A1 Jan. 2, 2003

Related U.S. Application Data

(60) Provisional application No. 60/298,386, filed on Jun. 18, 2001, and provisional application No. 60/281,368, filed on Apr. 5, 2001.

(51) Int. Cl.[7] .............. B27N 5/02; B65D 3/06; B65D 81/38; A47J 41/00
(52) U.S. Cl. .............. 428/34.2; 428/36.5; 220/903; 220/592.25; 229/403
(58) Field of Search .................. 220/903, 592, 220/25; 428/34.2, 36.5; 229/403

(56) References Cited

U.S. PATENT DOCUMENTS

| | | | |
|---|---|---|---|
| 3,988,521 A | * 10/1976 | Fumel et al. .............. 428/34.2 |
| 4,435,344 A | 3/1984 | Iioka .................. 264/45.1 |
| 4,923,557 A | 5/1990 | Dickey .................. 156/86 |
| 5,445,315 A | * 8/1995 | Shelby ................ 229/117.06 |
| 5,490,631 A | 2/1996 | Iioka et al. .............. 229/403 |
| 5,667,135 A | 9/1997 | Schaefer .................. 229/403 |
| 5,840,139 A | 11/1998 | Geddes et al. .............. 156/79 |
| 5,911,904 A | 6/1999 | Shih et al. .................. 252/62 |
| 5,952,068 A | 9/1999 | Neale et al. .............. 428/36.5 |
| 5,993,705 A | 11/1999 | Grishchenko et al. ...... 264/46.9 |
| 6,030,476 A | 2/2000 | Geddes et al. .............. 156/79 |
| 6,070,755 A | 6/2000 | Evans et al. .............. 220/793 |
| 6,085,970 A | 7/2000 | Sadlier .................. 229/403 |
| 6,224,954 B1 | 5/2001 | Mitchell et al. .......... 428/34.2 |
| 6,265,040 B1 | * 7/2001 | Neale et al. .............. 428/36.5 |
| 6,277,454 B1 | * 8/2001 | Neale et al. .............. 428/34.2 |

* cited by examiner

*Primary Examiner*—Harold Pyon
*Assistant Examiner*—Chris Bruenjes
(74) *Attorney, Agent, or Firm*—Birch, Stewart, Kolasch & Birch, LLP

(57) ABSTRACT

An insulating beverage cup or sleeve is produced with a foam layer disposed on an inner surface of a food or beverage paper stock. A polyethylene film layer is arranged in a position between a paper stock layer and an inside surface of the beverage container. The foam layer decreases the energy transfer between the beverage and the user's hands allowing the user to hold onto the cup for an extended period of time without causing user discomfort or pain, e.g. greatly extends the hold time of the paper cup. The exterior surface of the beverage cup remains highly printable and predisposed to high quality graphics both before and after cup manufacture.

13 Claims, 5 Drawing Sheets

INSULATED BEVERAGE OR FOOD CONTAINER

PRIORITY

The present inventors claim the benefit of United States Provisional Application 60/281,368, filed on Apr. 5, 2001, "Insulated Beverage or Food Container;" and U.S. Provisional Application 60/298,386, filed on Jun. 18, 2001, "Insulated Beverage or Food Container;" the entire contents of which is hereby incorporated by reference.

BACKGROUND OF THE INVENTION

1. Field of the Invention

The present invention relates to an apparatus and method for insulating beverage containers and container stock material. In particular, the present invention relates to an insulated, paper-based beverage container or stock material having improved insulation properties and a method of producing these insulated containers or stock materials.

2. Description of the Background Art

Current standard paper cup stock permits excessive heat transfer through the wall of an insulated beverage container. Accordingly, a user's hand becomes uncomfortably or sometimes even painfully hot when excessive heat transfer is permitted through the container wall. This may require the user to be inconvenienced by having to release the container due to the excessive heat of the container's contents. An analogous but opposite situation can occur with very cold beverages, where heat transfer from a user's hand is transferred rapidly to the contents of the container.

U.S. Pat. No. 4,435,344 to Ioka describes a method for producing an insulating composite paper container having a body member and a bottom member. The body member is formed of paper coated or laminated with a thermoplastic synthetic resin film. A surface of the body member is then heated to form a foamed polyethylene heat-insulating layer on either or both of inner and outer surfaces of the container's body member. The heat-insulated body member is then attached to the bottom member.

U.S. Pat. Nos. 6,030,476 and 5,840,139 to Geddes et al. describe a method for producing insulating beverage containers or cups, stock material and containers made therefrom. A stock material includes a base layer, an insulating layer formed on a portion of the base layer, and a printed pattern/mineral oil applied to the insulating layer. The insulating layer is formed from a thermoplastic synthetic resin film. U.S. Pat. No. 6,030,476 describes a polyethylene foam taught on the outside surface of the paper cup.

European Patent Application EP 0940240 A2 describes a heat insulating paper cup with targeted insulation in areas where printed matter exists. The body member of the cup is coated on its outside surface with a foamable synthetic resin and on its inside surface with an inside surface laminate of a synthetic resin effective to prevent liquid penetration. The bottom panel member is optionally coated on its upper surface with a foamed or an unfoamed synthetic resin. Printed matter is provided prior to foaming of the synthetic resin on the outer surface of the cup with water-based ink. Further, the low density polyethylene is foamed by vaporizing the water contained in the paper stock.

European Patent Application EP 1060879 A2 describes a heat insulating paper cup having a body member partially or fully coated on its outside surface with a foamed low density polyethylene and coated on its inside surface with an unfoamed modified low density polyethyelene.

However, the devices and methods of the background art suffer from the following disadvantages. Other known designs sacrifice the outside printability of the cup to provide insulation or do not provide adequate insulation properties. As described above, many designs necessitate application of printed material prior to the manufacture of the paper cup, thereby limiting the ability to print or graphically enhance the cups after they have been manufactured.

The related art has not yet achieved insulated paper stock that is capable of effectively impeding heat transfer between the contents of the container and the exterior. In addition, adequate thermal insulation is not achieved from the related art in a manner that is cost effective.

SUMMARY OF THE INVENTION

The present invention overcomes the shortcomings associated with conventional devices and methods, and achieves other advantages not realized by conventional devices and methods.

It is an aspect of the present invention to provide an insulated beverage container, sleeve or stock material that reduces the energy transfer through a container wall, offers increased functionality and usefulness.

It is an aspect of the present invention to provide a container, sleeve, or stock material having superior hold times and pre-disposed to high quality printing and graphics.

The present invention is a recognition, in part, that the ability to produce blank paper cups, sleeves or stock material that can be printed/graphically enhanced is desirable. This invention permits a superior insulating cup product to be made from standardized manufacturing processes.

These and other aspects of the present invention are accomplished by an insulated beverage container stock material comprising a paper stock layer and a foam layer disposed along an interior surface of the paper stock layer. The foam layer can be adhered directly or indirectly to the paper stock layer by melt extrusion, lamination or foam extrusion.

These and other aspects of the present invention are further accomplished by an insulated beverage container comprising a container wall having a side portion; a bottom portion engaging said container wall along a lower side portion; a paper stock layer arranged along an exterior surface of said container wall; a thin polyethylene film layer; and a foam layer arranged along an interior surface of the container wall, the foam layer sandwiched between the polyethylene film layer and the paper stock layer. Optionally, the thin polyethylene film layer can be sandwiched between the foam layer and the paper stock. Also, optionally two thin polyethylene film layers can be used, one on each side of the foam layer.

These and other aspects of the present invention are further accomplished by a method of producing an insulated beverage container, comprising the steps of providing a paper cupstock having a container wall for surrounding a beverage containing space, a bottom portion, and a paper stock layer arranged along an exterior surface of said container wall; foaming a polymer into a foam layer by mixing a blowing agent into the polymer prior to foaming; and adhering the foam layer to the paper stock Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

The present invention is directed toward an insulated beverage container or cup, the container stock material, and a method of producing insulated beverage containers or stock materials that utilize a polyethylene foam layer extruded or laminated to a surface of a food or beverage paper stock. The present invention is described in greater detail hereinafter with reference to the accompanying drawings.

Figure 1:
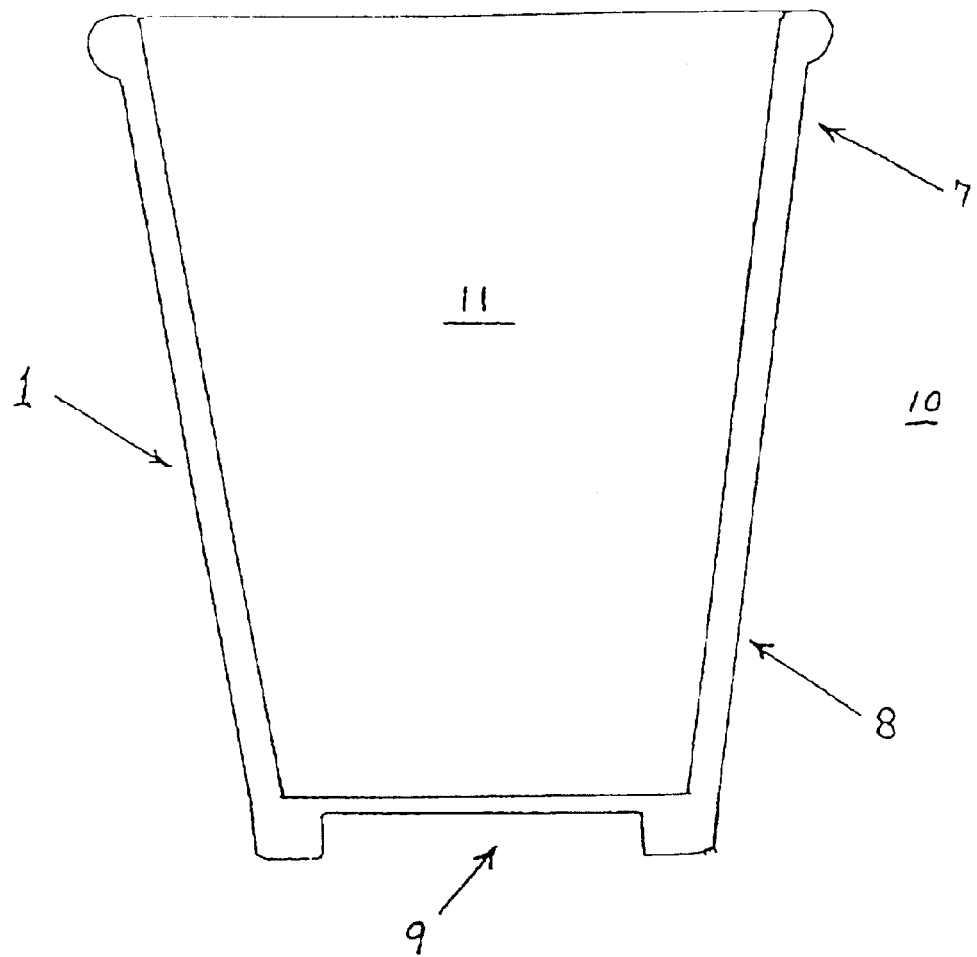
FIG. 1 is a side cross-sectional view of an insulated beverage container according to the present invention.

FIGS. 2 through FIG. 5 are cross-sectional views of an insulated beverage container wall 1 according to various embodiments of the present invention. One of ordinary skill in the art will appreciate that an insulated container 10 as shown in FIG. 1 will readily incorporate each of the beverage container walls depicted in FIGS. 2 through FIG. 5. While the following description is directed toward a cup, the techniques of this invention can be applied to any number of containers or surfaces, for instance a beverage container insulating beverage sleeve or stock material can be constructed from any of the embodiments shown in the accompanying drawings.

FIG. 1 is a side cross-sectional view of an insulated beverage container 10 according to the present invention. The insulated beverage container includes a container wall 1 having an upper side portion 7, a lower side portion 8 and a bottom portion 9. A beverage containing space 11 is formed between the container wall's 1 upper side portion 7, lower side portion 8 and bottom portion 9.

As aforementioned, current standard paper cup stock allows excessive heat to transfer through the wall of the container. This results in a user's hand becoming uncomfortably or sometimes even painfully hot or cold when grasping a hot or cold container. A quantitative measurement of the ability of a paper stock to withstand heat transfer between the beverage containing space and the outermost surface of the container is often referred to as hold time. It will be appreciated that the present invention significantly improves the hold time of paper-based stock beverage containers over the related art.

The present invention utilizes a gas containing film adhered or selectively adhered to the surface of a paper stock. The gas containing film layer provides resistance to heat transfer through the container wall 1. The present invention provides an insulating container construction and a method of producing this construction which reduces the energy transfer through the container wall, providing increased functionality and usefulness.

Figure 2:
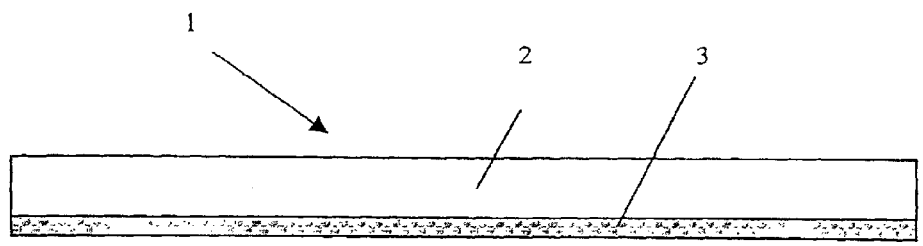
FIG. 2 is a cross-sectional view of an insulated beverage container wall or sleeve according to a second embodiment of the present invention.

FIG. 2 is a cross-sectional view of an insulated beverage container wall or sleeve 1 according to a first embodiment of the present invention. A beverage container wall or sleeve 1 includes a paper stock 2, and an extruded or laminated foam layer 3. The paper stock 2 provides structural rigidity and forms the desired shape of the container 10 or a portion of a sleeve wall. The extruded or laminated foam layer 3 is adhered to an inner surface (e.g. facing the beverage containing space 11) of the paper stock 2 and performs the function of a gas containing film layer. The foam layer 3 is designed to provide thermal insulation properties to the container.

The paper stock 2 is standard paper used for making beverage cups and other food containers. The paper stock 2 may be chosen with a thickness that provides optimized physical characteristics for cup construction. Important physical characteristics include fold strength, stiffness, tear and tensile strength.

A desired paper thickness is chosen such that the resultant thickness of the finished cup wall 1 does not negatively impact converting, handling or finished cup properties. A typical paper stock 2 for beverage and food containers range from 10 to 40 mils in a paper stock 2 thickness, and more particularly from 10 mils to 26 mils in thickness in a preferred embodiment for the present invention. Where the present invention is applied to an insulating beverage sleeve, the paper stock 2 may be chosen with a thickness which provides the proper physical characteristics such as strength for constructing a sleeve surrounding a beverage container 10 such as that shown in FIG. 1. Important physical characteristics include fold strength, stiffness, tear and tensile strength. The paper thickness is chosen such that the resultant thickness of the sleeve and cup wall does not negatively impact handling, distribution or become cumbersome to the end user. Additional criteria affecting paper stock selection includes appearance and cost. A smooth, bleached-white paper may be chosen to enhance the print quality and the appeal of the cup or a brown kraft stock may be chosen for economy. Applicable paper suitable for sleeve stock ranges from 2 mils to 10 mils for the application to an insulating beverage sleeve.

The extruded or laminated foam layer 3 is applied to the paper stock 2 as an extrusion, lamination, or it is melted or fused. The purpose of the extruded or laminated foam layer 3 is to provide thermal insulation properties, to contain liquids and to provide heat sealing. However, the extruded or laminated foam layer 3 can also be used as a barrier to moisture transmission and further aids in seam sealing during container construction. In the case of an insulating beverage sleeve, the foam layer 3 is a gas containing layer that provides resistance to heat transfer through the sleeve wall.

The extruded or laminated foam layer 3, although not limited to, can be formed from any of the following exemplary materials: high density polyethylene (HDPE), low density polyethylene (LDPE), linear low density polyethylene (LLDPE), orientated polypropylene (OPP), etc. HDPE and LDPE are desirable materials in a preferred embodiment of the present invention.

Additives may also be included to enhance various material properties or to aid in the manufacturing process. These additives include, but are not limited to, any of the following exemplary additives: ethylene vinyl acetate (EVA), ethylene vinyl alcohol (EVOH), and plasticizers.

The foam layer 3 is attached to the paper stock uniformly during the manufacturing process. The gases trapped within the film of the foam layer 3 impart a high level of thermal insulation to the container wall. An important aspect of the gas containing foam layer 3 is to provide resistance to energy transfer. The amount of trapped gas is variable and depends upon a specified volume that will render the exterior of the container comfortable to hold for an average user. Therefore, the required amount of trapped air will generally vary according to the intended use of the container.

For instance, a container used to serve coffee (normally 190° F.) will need more resistance to energy flow than a similar container used to serve a relatively cool cup of soup (normally 165° F.). An additional benefit to the insulating layer is the ability of the container to keep the food or beverage at its serving temperature for a longer period of time.

The foam layer 3 can be either laminated to or extruded onto the paper stock 2. When the film is laminated, a gas containing film such as CA-20 manufactured by Sealed Air Corporation or other may be used. When the film is extruded onto the paper stock 2 a blowing agent is mixed into the polymer prior to extrusion. The incorporated blowing agent creates gas pockets within the film during the extruding process. The extrusion method offers the additional advantage of creating the product in one operational step.

The insulating foam layer 3 is preferably between 2 and 30 lbs/3300 ft$^2$, and more preferably between 5 and 15 lbs/3300 ft$^2$. The density of the film is preferably between 1.0 and 3.0 lbs/ft3. The thickness of the insulating gas containing foam layer 3 is preferably between 5 and 30 mils, and more preferably between 10 and 20 mils. The foam layer 3 can be a gas containing film layer formed from a continuous single layer or lamination of films and foam.

Figure 3:
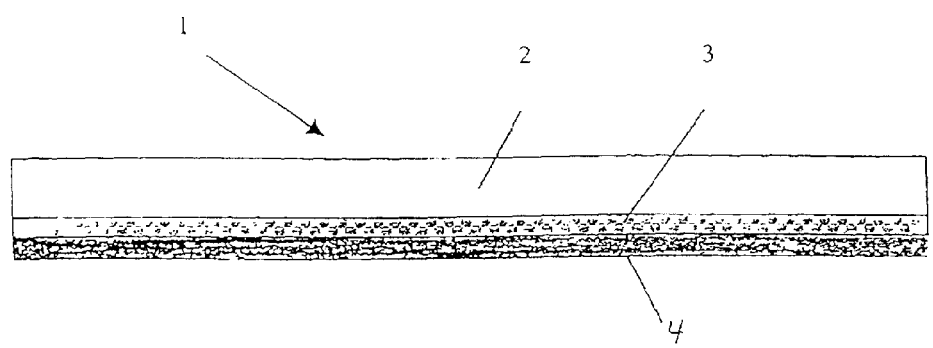
FIG. 3 is a cross-sectional view of an insulated beverage container wall according to a third embodiment of the present invention.

FIG. 3 is a cross sectional view of a container wall according to a second embodiment of the present invention. A film layer 4 is extruded, laminated, or coated in a position between the foam containing layer 3 and the beverage containing space 11. The foam layer 3 is therefore interposed between the paper stock 2 and the film layer 4. The film layer 4 will hereinafter be referred to as a PE layer 4. The PE layer 4 can be used as a barrier against moisture transmission and aids in seam sealing during container construction.

In a preferred embodiment, the foam layer 3 is first formed and then it is melt extruded, laminated or melt fused to the surface of the paper stock 2. The residual moisture held within the paper stock 2 which is characteristically relied upon in the related art, is not relied upon as the mechanism for creating the foam layer 3. The foam can also be extruded to the paper stock 2, but in each instance the foaming is created by mixing a blowing agent into the polymer prior to extrusion or foam creation. The incorporated blowing agent creates gas pockets within the film during the extruding process. The extruded method offers the advantage of directly creating the product in one operational step.

The foam layer 3 can also be treated in order to accept or conform with various printing inks. The foam layer 3 can be treated by various means well known in the industry such as, but not limited to: corona treatment, flame treatment, ozone treatment, coatings, etc.

Figure 4:
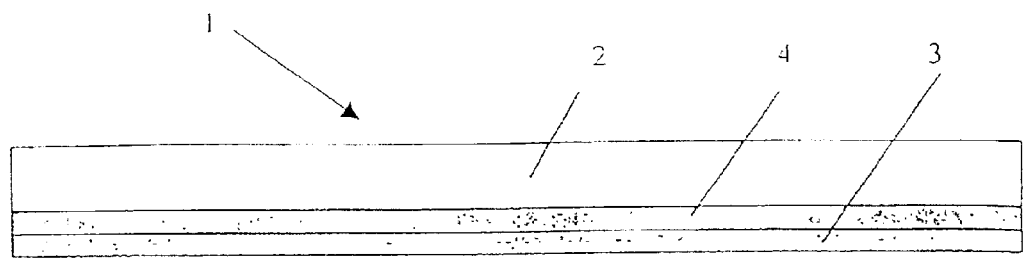
FIG. 4 is a cross-sectional view of an insulated beverage container wall according to a fourth embodiment of the present invention.

FIG. 4 is a cross sectional view of a container wall according to a third embodiment of the present invention. A PE layer 4 is extruded, laminated, or coated in a position interposed between the foam containing layer 3 and the paper stock 2. However, PE layer 4 can also be used as a barrier against moisture transmission and aids in seam sealing during container construction.

The PE layer 4, although not limited to, can be formed from any of the following exemplary materials: high density polyethylene (HDPE), low density polyethylene (LDPE), linear low density polyethylene (LLDPE), orientated polypropylene (OPP), etc. HDPE and LDPE are desirable materials in a preferred embodiment of the present invention.

Additives may also be included to enhance various material properties or to aid in the manufacturing process. These additives include, but are not limited to, any of the following exemplary additives: ethylene vinyl acetate (EVA), ethylene vinyl alcohol (EVOH), and plasticizers.

Figure 5:
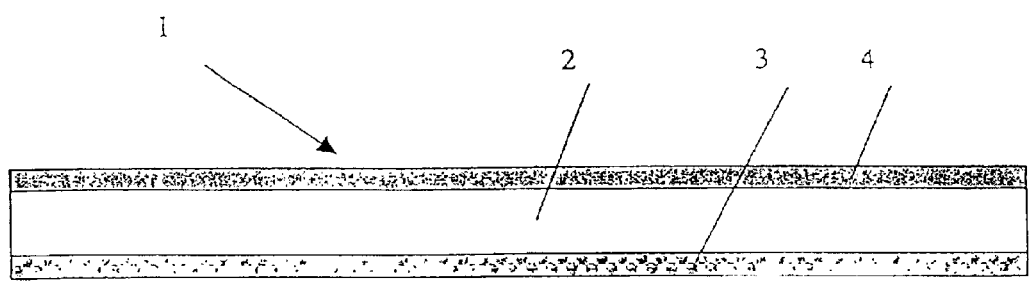
FIG. 5 is a cross-sectional view of an insulated beverage container wall according to a fourth embodiment of the present invention.

FIG. 5 is a cross sectional view of a container wall according to a fourth embodiment of the present invention. A PE layer 4 has been applied to an outside surface of the paper stock 2. The PE layer 4 can be laminated, extruded or coated onto the paper stock surface. The PE layer 4 also serves a barrier to the beverage or food placed within the container, and can also serve as a sealing mechanism. Alternatively, the PE layer 4 could be applied as the innermost layer, e.g. closest to the beverage containing space 11. Further, additional PE layers 4 can be applied to either the inside or outside surfaces of the container wall 1 as desired to add additional barriers to the liquid or heat sealed within the container. The PE layer 4 can be applied to the paper stock or over the foam.

A preferred coating material for additional coating layers for the present invention is an expanding foam. This expanding foam material is encapsulated isobutane in a polymeric shell. The expanding foam capsules are added to the coating with a small diameter. Upon drying the foam and increasing the heat to a certain temperature, the encapsulated isobutane changes from a liquid to a gas and the polymeric shell expands with the appropriate volumetric change.

The resulting expanded spheres or cavities have a very low density and low thermal conductivity. Expanded foam also has the advantage of creating a rough surface that will further reduce the contact area between layers in the container wall and therefore reduce heat transfer. A thin layer of the expanding foam coated onto the paper stock exterior is especially useful for roughening or for texturing to aid in gripping the container.

A preferred coating is a foamed coating. Foamed coating is a coating that utilizes entrained air. The dispersed air in the coating provides a low coating density and low thermal conductivity. The foamed coating also accepts and is easily processed to achieve surface modification. The foamed coating will therefore allow a rough or perforated surface to be created through the means of an embosser, press or other mechanical device.

Foam coating also has the ability to be used as a single coating, or may also act as the insulating coating and a printing coating simultaneously, depending on the application and desires of the end user.

The selected coating materials for the insulating coating are dispersed in an aqueous system with additional components added as necessary to provide ease of processing and application. Pigments such as silica, calcium carbonate, clay and synthetic pigments may be also used.

Binders are included to adhere the coating to the paper substrate. Typical binders may be selected from, but are not limited to, poly vinyl alcohol, SBR latex, starch, poly acrylates and other binders well known in the related art. Other additives may be included in the coating to aid in dispersion, rheology and coating handling. These additives include, but are not limited to, defoamers, dispersants, wetting agents, conductive polymers, styrene malefic anhydride, thickeners, etc.

An insulating coating can be applied that is between 2 and 30 lbs/3300 ft$^2$, and more preferably between 5 and 15 lbs/3300 ft$^2$. A preferred thickness of the insulating coating is between 1 and 15 mils, most preferably between 3 and 10 mils.

U.S. Pat. Nos. 5,911,904 to Shih et al; U.S. Pat. No. 5,993,705 to Grischchenko et al.; and U.S. Pat. No. 6,085,970 to Sadlier, although directed toward distinct insulating container coatings and fabrication processes from that of the present invention, generally describe many of the manufacturing coating, heating and assembling processes that are commonly utilized in the paper cup/container stock art. The details of these coatings, heating and assembling processes are herein incorporated by reference to the present invention.

The preferred embodiments depicted in the accompanying figures are directed toward the application of a foam layer 3 toward or along the interior surface of a container (e.g. beverage-side of the container). However, it will be appreciated by one of ordinary skill in the art that the foam layer 3 can be alternatively, or in combination with the PE film layer 4, applied along the exterior surface of the container.

The inventors of the present invention have discovered highly favorable, and heretofore unexpected, results when testing was conducted of the various preferred embodiments of the present invention. For example, a beverage container 10 constructed with a container wall 1 having the construction shown in FIG. 3 has demonstrated extraordinary hold times, moisture inhibition and resistance to vapor transmission. Further, the inventors of the present invention have demonstrated that hold times are significantly increased with the embodiment shown in FIG. 3 as compared to providing a moisture foam layer 3 blown on the outside surface of the paper stock 2, such as the PerfecTouch™ cup sold by Georgia Pacific™.

As aforementioned, a quantitative measurement of the ability of a paper stock to withstand heat transfer between the beverage containing space and the outermost surface of the container is often referred to as hold time. With the foam layer 3 provided on the exterior surface of the paper stock 2, the heat of the beverage (e.g. coffee) contributes to heating and vaporizing of the residual moisture in the paper stock. Accordingly, how long one can comfortably hold the hot container 10, e.g. hold time, is significantly reduced.

The preferred embodiment shown in FIG. 3 appears to best inhibit heat transfer to the paper stock 2, thereby reducing heat transfer by providing a moisture vapor transmission rate barrier at the innermost surface which prevents heating by mass transfer of that vapor through the cupstock. Hold times were significantly increased with the preferred embodiments of the present invention.

Figure 6:
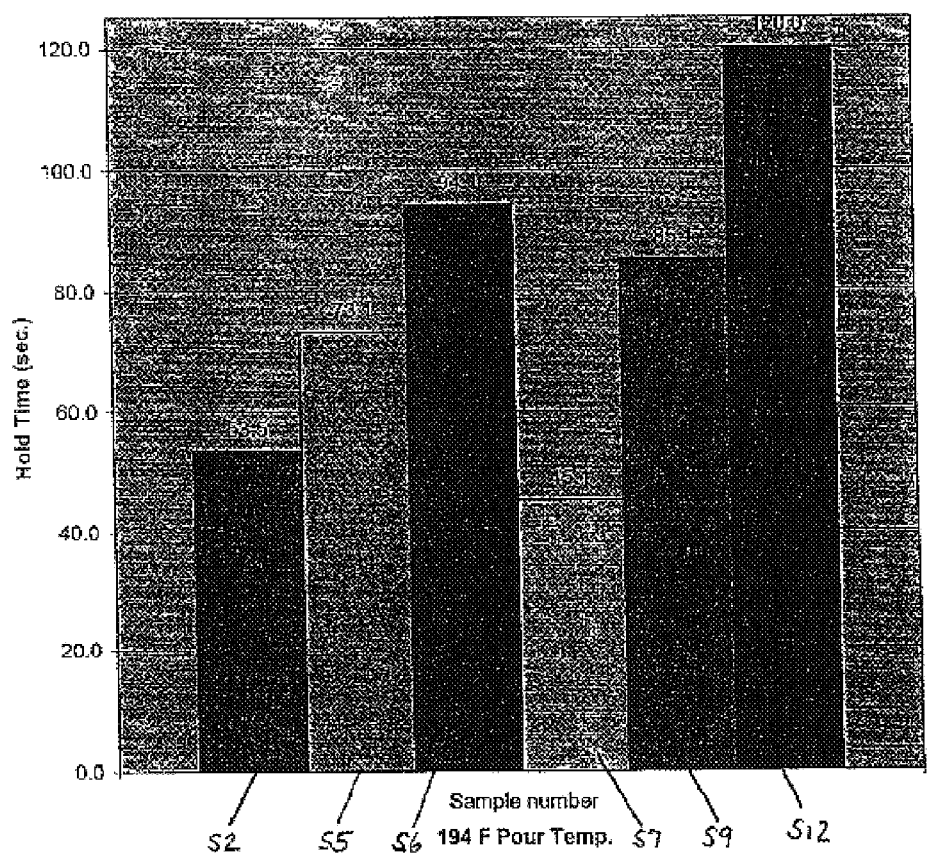
FIG. 6 is a graphical view of experimental data representing actual and comparative hold times for embodiments of the present invention and commercial available products.
Figure 7:
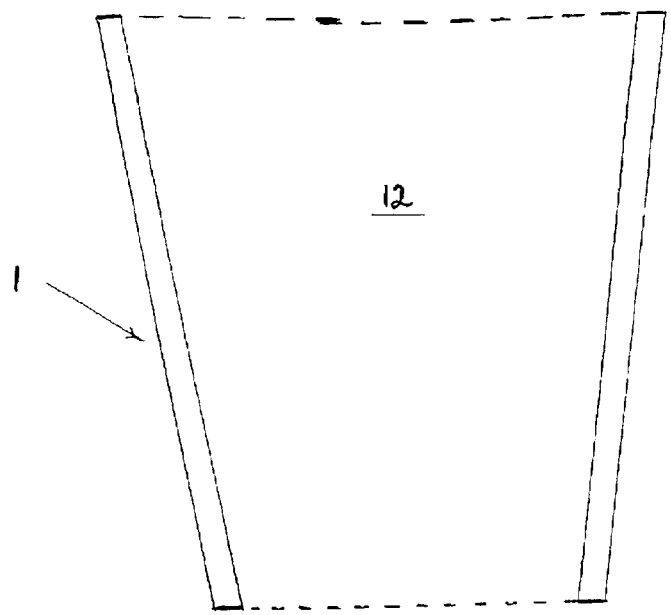
FIG. 7 is a cross sectional view of an insulating beverage container sleeve according to the present invention.
Figure 8:
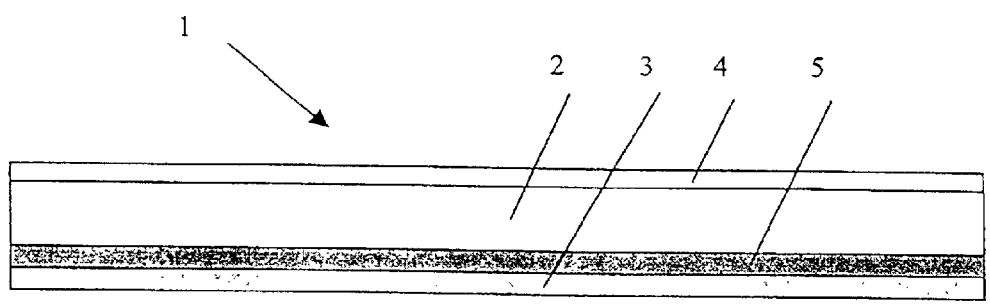
FIG. 8 is a cross-sectional view of an insulated beverage container wall or beverage container sleeve wall according to another embodiment of the present invention.

FIG. 6 is a graphical view of experimental data representing actual and comparative hold times for embodiments of the present invention and commercial available products. FIG. 7 is a cross sectional view of an insulating beverage container sleeve 12 according to the present invention. FIG. 8 is a cross-sectional view of an insulated beverage container wall 1 or beverage container sleeve wall 1 according to another embodiment of the present invention.

It will be appreciated that an insulating beverage container sleeve 12 can readily incorporate any of the applicable embodiments of beverage container stock material (container wall) 1 shown in the accompanying drawings. An insulating beverage container sleeve 12 is often slipped over the outer surface of a beverage container such as that shown in FIG. 1. As seen in FIG. 8, an intermediate layer 5 is provided between the paper stock 2 and foam layer 3. The intermediate layer 5 is applied to the paper stock as an extrusion, lamination, or coating. The purpose of the layer is to adhere the gas containing film layer 3 to the paper stock 2. However, the intermediate layer 5 can also be utilized as a barrier to moisture transmission and as an aid in seam sealing during sleeve construction. Typical materials used for intermediate layer 5 include, but are not limited to: high density polyethylene (HDPE), low density polyethylene (LDPE), linear low density polyethylene (LLDP), orientated polypropylene(OPP); and adhesives, such as hot melt adhesives, water based adhesives and solvent based adhesives, etc.

Additives known in the industry may be included to enhance certain properties or aid in processing and may include, but are not limited to: ethylene vinyl acetate (EVA), ethylene vinyl alcohol (EVOH), and plasticizers. Exterior layer 4 is applied to the paper stock to provide a surface which may have the following properties depending on end use, including but not limited to: materials accepting high quality graphics and printing inks, materials providing tactile feel, materials that change color with temperature, materials providing seam sealing capabilities, and materials providing a more secure gripping surface, etc. The sleeve 12 construction may be preferentially oriented with the foam material 3 toward the cup 11 surface and the paper surface 2, 4 facing outward, e.g. visible to the user. However, the sleeve construction can be inverted with the foam on the exterior and the paper surface(s) 2, 4 facing inwardly toward the cup/container 11 wall.

FIG. 6 is a graphical view of experimental data representing actual and comparative hold times for embodiments of the present invention and commercial available products. FIG. 6 shows experimental hold times (measured in seconds) achieved for different samples. The various samples or beverage containers were filled with approximately 230 ml of water at approximately 90° C. (194° F. pour temperature).

In Table 1, Sample S2 is a container known as Insulair™ having a 15/15/15/pt (1 pt=$\frac{1}{1000}$ in.) base paper/corrugated/base paper design. The container is essentially a paper exterior and interior with a corrugated core. Sample S5, Sample S6, and Sample S7 are test samples of the present invention incorporating a container wall 1 with construction similar to that shown in FIG. 3. Sample S5 is a 10 pt foam 18 pt base paper laminate. S6 is a 20 point foam 18 pt base paper laminate. S7 is a 30 pt foam 18 pt base paper laminate.

Sample S9 is a paper stock with a moisture-blown polyethylene exterior such as the PerfecTouch™ container available from Georgia Pacific™. Sample S10 is an 18 pt paper cup. Sample S12 is a laminate foam 18 pt base with 20 pt polyethylene foam. Sample 14 is an 18 pt paper with a 37 pt sleeve utilizing MicroPearl™ coated on the exterior. Sample S16 is a 18 pt paper with a 20 pt laminated polyethylene foam.

Testing was conducted of different samples to determine average hold times after several iterations of testing. A control test person was used in many testing results to maintain data integrity. In alternative testing, several different control test persons were utilized.

Table I provides experimental test results of insulated cup hold time studies conducted at a pour temperature of 90° C. and with approximately 230 ml. of water. Table I is directed toward the test results of the various samples. The various samples were rinsed out after each test with ambient water.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE I

Insulated Cup Hold Time Study
Pour Temperature - 90° C.
All Cups contained 230 ml. H2O
Hold Times in seconds

| Sample Number | 2 | 5 | 6 | 7 | 9 | 10 | 12 | 14 | 16 |
|---|---|---|---|---|---|---|---|---|---|
| | Insulair ™ | 10 pt Foam 18 pt Base | CA-20 | CA-30 | Product Sample | 18 pt. Heavy Paper Cup | 10 pt w/ 18 pt base | Expanded foam | 19 pt. Poly w/ 1/48 Lami foam |
| Caliper 1/2 thousandths of an inch | | 32.5 | 37 | 43.5 | | | 27.5 | | |
| Hold Times | | | | | | | | | |
| Average: | 53.5 | 85.1 | 73.1 | 94.1 | 29.6 | 9.0 | 55.8 | 106.5 | 120.0 |
| minus ctrl: | 45.0 | 76.6 | 64.6 | 85.6 | 21.1 | 0.5 | 47.3 | 98.0 | 111.5 |
| minus Perf touch: | 23.9 | 55.5 | 43.4 | 64.5 | 0.0 | −20.6 | 26.1 | 76.9 | 90.4 |
| minus Insulair ™: | 0.0 | 31.6 | 19.6 | 40.6 | −23.9 | −44.5 | 2.3 | 53.0 | 66.5 |

What is claimed is:

1. An insulated beverage container stock material comprising:
    said stock material having an innermost surface and an outermost surface, said stock material including
        a paper stock layer having an interior surface and an exterior surface, said exterior surface of said paper stock layer forming the outermost surface of said stock material;
        a foam layer being disposed along the interior surface of the paper stock layer, wherein said foam layer is heat laminated foam formed from high density polyethylene, low density polyethylene, linear low density polyethylene, or oriented polypropylene; and
        a polyethylene barrier film layer being disposed along the interior surface of the paper stock layer and in continuous and direct contact with said foam layer and said pacer stock layer, wherein the foam layer forms said innermost surface of said stock material.

2. The insulated beverage container stock material according to claim 1, wherein said paper stock material has a thickness greater than or equal to 10 mils and less than or equal to 26 mils.

3. An insulated beverage container stock material comprising:
    said stock material having an innermost surface and an outermost surface, said stock material including
        a paper stock layer having an interior surface and an exterior surface, said exterior surface of said paper stock layer forming the outermost surface of said stock material;
        a foam layer being disposed along the interior surface of the paper stock layer, wherein said foam layer is heat laminated foam formed from high density polyethylene, low density polyethylene, linear low density polyethylene, or oriented polypropylene;
        a first polyethylene barrier film layer being disposed along the interior surface of the paper stock layer and in continuous and direct contact with said foam layer and said paper stock layer; and
        a second polyethylene barrier film layer forming the innermost surface of said stock material and in continuous and direct contact with said foam layer.

4. An insulated beverage container sleeve comprising:
    a bottomless container wall having a sidewall enclosing a beverage container space, said sidewall including an innermost surface and an outermost surface;
    a paper stack layer forming the outermost surface of said sidewall;
    a heat laminated foam layer being disposed along an interior surface of the paper stock layer; and
    a polyethylene barrier film layer being disposed along the interior surface of said paper stock layer in continuous and direct contact with said foam layer and said paper stock layer, wherein said foam layer forms said innermost surface of said sleeve.

5. The insulated beverage container sleeve according to claim 4, said paper stock material has a thickness greater than or equal to 2 mils and less than or equal to 10 mils.

6. The insulated beverage container sleeve according to claim 4, wherein said foam layer is formed from high density polyethylene, low density polyethylene, linear low density polyethylene, or oriented polypropylene.

7. The insulated beverage container sleeve according to claim 6, wherein said foam layer is adhered to said paper stock layer by melt extrusion, lamination or foam extrusion.

8. An insulated beverage container sleeve comprising:
    a bottomless container wall having a sidewall enclosing a beverage container space, said sidewall including an innermost surface and an outermost surface;
    a paper stock layer forming the outermost surface of said sidewall;
    a heat laminated foam layer being disposed along an interior surface of the paper stock layer; and
    a first polyethylene barrier film layer being disposed along the interior surface of said paper stock layer in continuous and direct contact with said foam layer and said paper stock layer; and a second polyethylene barrier film layer forming the innermost surface of said stock material and in continuous and direct contact with said foam layer.

9. The insulated beverage container sleeve according to claim 8, wherein said foam layer is formed from high density polyethylene, low density polyethylene, linear low density polyethylene, or oriented polypropylene.

10. An insulated beverage container comprising:
   a container wall having a side portion enclosing a beverage containing space, and having an innermost surface and an outermost surface; and
   a bottom portion engaging said container wall along said side portion; wherein said container wall further includes
      a paper stock layer forming the outermost surface of said container wall;
      a thin polyethylene barrier film layer being arranged between said paper stock layer and said beverage containing space and forming said innermost surface of said container wall; and
      a heat laminated foam layer arranged along an interior surface of the paper stock layer and in continuous and direct contact with said polyethylene barrier film layer and said paper stock layer.

11. The insulated beverage container according to claim 10, wherein said foam layer is foam formed from high density polyethylene, low density polyethylene, linear low density polyethylene, or oriented polypropylene.

12. The insulated beverage container according to claim 10, wherein said innermost surface of said container wall immediately in contact with said beverage containing space includes a seamless and smooth surface.

13. An insulated beverage container comprising:
   a container wall having a side portion enclosing a beverage containing space, and having an innermost surface and an outermost surface; and
   a bottom portion engaging said container wall along said side portion; wherein said container wall further includes
      a paper stock layer forming the outermost surface of said container wall;
      a thin polyethylene barrier film layer being arranged between said paper stock layer and said beverage containing space; and
      a foam layer arranged along an interior surface of the container wall and forming the innermost surface of said container wall, said polyethylene film layer being in continuous and direct contact with said foam layer and said paper stock layer, wherein said foam layer is heat laminated foam formed from high density polyethylene, low density polyethylene, linear low density polyethylene, or oriented polypropylene.

* * * * *